United States Patent [19]

Shiga et al.

[11] Patent Number: 4,504,637
[45] Date of Patent: Mar. 12, 1985

[54] OLEFIN POLYMERIZATION CATALYSTS AND PROCESS FOR PRODUCING OLEFIN POLYMERS BY USING SUCH CATALYSTS

[75] Inventors: Akinobu Shiga; Toshio Sasaki; Junpei Kojima, all of Ichihara, Japan

[73] Assignee: Sumitomo Chemical Company, Limited, Osaka, Japan

[21] Appl. No.: 560,850

[22] Filed: Dec. 13, 1983

[30] Foreign Application Priority Data

Dec. 16, 1982 [JP] Japan ............................... 57-221661
Dec. 16, 1982 [JP] Japan ............................... 57-221662

[51] Int. Cl.$^3$ ......................... C08F 4/44; C08F 210/00
[52] U.S. Cl. ..................................... 526/119; 526/142; 526/151; 526/348; 526/347; 502/126; 502/134; 502/169; 502/172
[58] Field of Search ............... 526/119, 151, 348, 142; 502/126, 134, 104, 169, 172

[56] References Cited

U.S. PATENT DOCUMENTS 4,093,789  6/1978  Kuroda et al. ...................... 526/119
4,312,783  1/1982  Sakurai et al. ..................... 526/119

Primary Examiner—Harry Wong, Jr.
Assistant Examiner—F. Teskin
Attorney, Agent, or Firm—Stevens, Davis, Miller & Mosher

[57] ABSTRACT

A catalyst system for the polymerization of olefins comprising:

(A) a solid catalyst component containing hydrocarbyloxy groups obtained by reacting a titanium compound represented by the general formula $Ti(OR^1)_n X_{3-n}$ (wherein $R^1$ is a hydrocarbon group having 1 to 20 carbon atoms, X is a halogen atom, and n is a number defined by $0 < n \leq 3$) with an ether compound and titanium tetrachloride in a slurry state in the presence of a magnesium halide, and (B) an organoaluminum compound.

18 Claims, No Drawings

OLEFIN POLYMERIZATION CATALYSTS AND PROCESS FOR PRODUCING OLEFIN POLYMERS BY USING SUCH CATALYSTS

This invention relates to a novel catalyst system using a novel solid catalyst component for the polymerization of olefins and a process for producing olefin polymers by using such catalyst system.

It is well known in the art of olefin polymerization to use so-called Ziegler-Natta catalysts composed of transition metal compounds of Groups IVb-VIb of the Periodic Table and organometallic compounds of Groups I-III.

Many studies have been made recently on the development of highly active catalysts capable of providing a cost reduction in polymer production by eliminating the step of removing the catalyst from the produced polymer, thereby simplifying the production process. Intense research has also been also made on the catalysts of the type made by supporting transition metal compounds on various types of carriers for the purpose of elevating the catalytic activity per amount of transition metal in the catalyst, and it has been disclosed that many inorganic compounds such as oxides, hydroxides, chlorides and carbonates of metals or silicon, their mixtures and double salts can be an effective carrier for these catalysts. It is also known that a catalyst system using a magnesium compound as carrier with titanium tetrachloride or titanium trichloride supported thereon shows an especially high catalytic activity per amount of transition metal when used for olefin polymerization.

It has already been known that a catalyst system made by using as the support a magnesium compound obtained from reaction of a Grignard compound and an aluminum halide compound and/or a silicon halide compound and carrying titanium tetrachloride thereon serves as a highly active polymerization catalyst (Japanese Patent Publication No. 23561/80).

However, in practical use of the polymerization catalysts obtained from said known methods for the polymerization of olefins, although they show a high catalytic activity per amount of transition metal, they are still not satisfactorily high in catalytic activity per amount of solid catalyst. As a result, if the step of removing the catalyst from the product polymer obtained with said catalyst system is omitted from the polymerization process, problems such as poor heat stability of the obtained product or possible corrosion of processing equipment tend to arise.

Thus, a catalyst system capable of producing not only a high catalytic activity per amount of transition metal but also a satisfactorily high catalytic activity per amount of solid catalyst has been desired.

Also, in copolymerization of ethylene and other α-olefins, it is desirable to use a catalyst system having an α-olefin copolymerizability as good as possible from the standpoints of both producing process and production cost.

The present inventors have conducted extensive research for a catalyst system having a high catalytic activity per amount of transition metal and per amount of solid catalyst, as well in comparison with said conventional systems, and also showing an excellent α-olefin copolymerizability in the copolymerization of olefins. As a result of this research, the inventors found that a solid catalyst component containing hydrocarbyloxy groups obtained by reacting a titanium compound represented by the general formula $Ti(OR^1)_nX_{3-n}$ with an ether compound and titanium tetrachloride in the presence of a magnesium halide has a high catalytic activity per amount of transition metal and per amount of solid catalyst as well, and also shows a very favorable α-olefin copolymerizability in the homopolymerization and copolymerization of olefins by use of said solid catalyst component with an organoaluminum compound. The present invention was achieved on the basis of these findings.

An object of this invention is to provide a novel catalyst system for the polymerization of olefins.

Another object of this invention is to provide a process for producing olefin polymers using the above novel catalyst system.

Other objects and advantages of this invention will be apparent from the following descriptions.

Thus, according to this invention, there are provided a novel catalyst system using a novel solid catalyst component suited for olefin polymerization and a process for producing olefin polymers therewith, the solid catalyst component being prepared by reacting a titanium compound represented by the general formula $Ti(OR^1)_nX_{3-n}$ (wherein $R^1$ is a hydrocarbon group having 1 to 20 carbon atoms, X is a halogen atom, and n is a number defined by $0<n\leq 3$) with an ether compound and titanium tetrachloride in a slurry state in the presence of a magnesium halide.

A characteristic feature of this invention is a high polymer yield per amount titanium and solid catalyst component owing to a very high catalytic activity, which activity allows the catalyst residue removing step to be eliminated thereby providing a removal-free process. The present invention is also characterized by an excellent α-olefin copolymerizability in the copolymerization of ethylene and other α-olefins.

The titanium compound used in this invention is represented by the general formula $Ti(OR^1)_nX_{3-n}$ wherein $R^1$ is a hydrocarbon group having 1-20 carbon atoms, X is a halogen atom, and n is a number defined by $0<n\leq 3$. Examples of the hydrocarbon groups represented by $R^1$ in the above-shown general formula are alkyl groups such as methyl, ethyl, n-propyl, iso-propyl, n-butyl, isobutyl, n-amyl, n-hexyl, n-heptyl, n-octyl, n-decyl, n-dodecyl and the like, aryl groups such as phenyl, cresyl, xylyl, naphthyl and the like, cycloalkyl groups such as cyclohexyl, cyclopentyl and the like, allyl groups such as propenyl, and aralkyl groups such as benzyl.

It is possible to use a titanium compound having two or more different $OR^1$ groups.

Among said hydrocarbon groups, an alkyl group having 2 to 18 carbon atoms or an aryl group having 6 to 18 carbon atoms is preferred. A straight-chain alkyl group having 2 to 18 carbon atoms is especially preferred.

Typical examples of the halogen atoms represented by X in the above general formula are chlorine, bromine and iodine. Chlorine gives an especially good result.

The value of n in the general formula $Ti(OR^1)_nX_{3-n}$ falls in the following definition: $0<n\leq 3$, preferably $0.3\leq n\leq 2.0$.

The titanium compound represented by the formula $Ti(OR^1)_nX_{3-n}$ can be easily synthesized by reducing a tetravalent titanium compound represented by the general formula $Ti(OR^1)_pX_{4-p}$ (wherein $0<P\leq 4$) with an organoaluminum compound. Diethylaluminum chloride and ethylaluminum sesquichloride are the preferred organoaluminum compounds to be used for the reducing reaction.

The reducing reaction is preferably carried out by diluting the titanium compound and organoaluminum compound to a concentration of 10 to 70% by weight with an inert hydrocarbon solvent such as pentane, hexane, heptane, octane, decane, toluene and the like. The reducing reaction temperature is preferably within the range from 0° to 80° C.

The molar ratio of the organoaluminum compound to titanium compound in the reducing reaction is generally 0.3–3.0:1, but can be properly changed depending on the object. For instance, in the case of diethylaluminum chloride, its optimal molar ratio to the titanium compound is 0.5–1.5:1, and in the case of ethylaluminum sesquichloride, its optimal molar ratio to the titanium compound is 1.5–2.5:1.

After the reducing reaction, the reaction product is subjected to solid-liquid separation and then washed several times with an inert hydrocarbon solvent to obtain a titanium compound represented by the general formula $Ti(OR^1)_n X_{3-n}$.

Examples of the magnesium halide used in this invention are magnesium chloride, magnesium bromide, magnesium iodide and the like, among which magnesium chloride is preferred.

These magnesium halides need not be the pure magnesium halides in the strict sense of the word; they may contain electron donor compounds such as ethers, esters, alcohols and the like. Among these magnesium halides, those which have been subjected to a pulverization treatment by a ball mill or other means, or those which have been subjected to a preliminary treatment with an electron donor compound such as alcohols, ethers, esters, carboxylic acids or the like are preferred. Especially preferred are those magnesium halides which have been produced by reacting an organomagnesium compound with an aluminum halide compound represented by the general formula $R^2_m AlX_{3-m}$ (wherein $R^2$ is an alkyl, aryl or alkenyl group having 1 to 8 carbon atoms, X is a halogen atom, and m is a number defined by $0 \leq m < 3$) and/or a silicon halide compound represented by the general formula $R^3_l SiX_{4-l}$ (wherein $R^3$ is an alkyl, aryl or alkenyl group having 1 to 8 carbon atoms, X is a halogen atom, and l is a number defined by $0 \leq l < 4$). The organomagnesium compound used may be any type of organomagnesium compounds that can be generally produced from a reaction of alkyl halides and metallic magnesium. It is preferred, however, to use a Grignard compound represented by the general formula $R^4 MgX$ (wherein $R^4$ is an alkyl, aryl or alkenyl group having 1 to 8 carbon atoms, and X is a halogen atom) and/or a dialkyl magnesium compound represented by the general formula $R^4_2 Mg$ (wherein $R^4$ is as defined above). Examples of said Grignard compounds are ethylmagnesium chloride, n-propylmagnesium chloride, n-butylmagnesium chloride, tert-butylmagnesium chloride, phenylmagnesium chloride, ethylmagnesium iodide, n-butylmagnesium iodide and the like. Exemplary of said dialkylmagnesium compounds are diethylmagnesium, dipropylmagnesium, dibutylmagnesium, dihexylmagnesium, dioctylmagnesium, diphenylmagnesium, dibenzylmagnesium and the like.

These organomagnesium compounds, for use in this invention, are synthesized in the presence of an ether solvent such as ethyl ether, propyl ether, butyl ether, amyl ether and the like or a hydrocarbon solvent such as hexane, heptane, octane, cyclohexane, benzene, toluene, xylene and the like.

The aluminum halide compound represented by the general formula $R^2_m AlX_{3-m}$ (wherein $R^2$ is an alkyl, aryl or alkenyl group having 1 to 8 carbon atoms, X is a halogen atom, and m is a number defined by $0 \leq m < 3$) used in said reaction includes all the compounds having aluminum-halogen linkage (Al-X), but aluminum halide, alkyl-aluminum dihalide, dialkylaluminum halide and alkylaluminum sesquihalide are especially preferred. More definite examples of such compounds are anhydrous aluminum chloride, aluminum bromide, aluminum iodide, methylaluminum dichloride, ethylaluminum dichloride, n-propylaluminum dichloride, dimethylaluminum chloride, diethylaluminum chloride, di-n-propylaluminum chloride, methylaluminum sesquichloride, ethylaluminum sesquichloride and the like, among which anhydrous aluminum chloride, ethylaluminum dichloride, diethylaluminum chloride and ethylaluminum sesquichloride are especially preferred.

The silicon halide compound represented by the general formula $R^3_l SiX_{4-l}$ (wherein $R^3$ is an alkyl, aryl or alkenyl group having 7 to 8 carbon atoms, X is a halogen atom, and l is a number defined by $0 \leq l < 4$) includes all the compounds having silicon-halogen linkage (Si-X), but the greater the number of the halogen atoms, the better result is given. Examples of such compounds are silicon tetrachloride, silicon tetrabromide, methylsilyl trichloride, dimethylsilyl dichloride, trimethylsilyl chloride, ethylsilyl trichloride, diethylsilyl dichloride, triethylsilyl chloride, propylsilyl tribromide, butylsilyl trichloride, tributylsilyl chloride, vinylsilyl trichloride and the like, among which silicon tetrachloride is most preferred. The synthesis reaction is conducted in an inert gas atmosphere, such as nitrogen or argon gas atmosphere, in all cases. The reaction of said organomagnesium compound and said aluminum halide compound and/or said silicon halide compound is preferably carried out in a solvent at a temperature within the range from $-20°$ to $50°$ C., but the reaction system may be heated up to about $100°$ C. The solvent used for this reaction may be selected from aliphatic hydrocarbons such as pentane, hexane, heptane, toluene, xylene and the like, alicyclic hydrocarbons such as cyclohexane, cyclopentane and the like, and ether solvents such as diethyl ether, di-n-butyl ether, diamyl ether, tetrahydrofuran, dioxane and the like. It is especially preferred, however, to use di-n-butyl ether.

The reaction ratio of the organomagnesium compound to the aluminum halide compound and/or silicon halide compound is within the range of 0.1 to 10.0, preferably 0.5 to 2.0 by mole.

The halide of magnesium obtained in the manner described above is used after the following treatment: it is allowed to stand as it is and, after separating the supernatant, the residue is washed well with a purified hydrocarbon solvent.

As examples of the ether compounds used in this invention, the following may be cited: diethyl ether, di-n-propyl ether, diisopropyl ether, di-n-butyl ether, di-n-amyl ether, diisoamyl ether, dineopentyl ether, di-n-hexyl ether, di-n-octyl ether, methyl-n-butyl ether, methyl-isoamyl ether, ethyl-isobutyl ether and the like. Among these ether compounds, di-n-butyl ether and diisoamyl ether are especially preferred.

The amount of the ether compound used is 0.1 to 5 moles, preferably 0.3 to 3 moles, to one mole of the titanium compound represented by the general formula $Ti(OR^1)_nX_{3-n}$.

The amount of titanium tetrachloride added is 0.1 to 10 moles, preferably 0.5 to 5 moles, to one mole of the titanium compound represented by the general formula $Ti(OR^1)_nX_{3-n}$.

The amount of titanium tetrachloride to one mole of the ether compound is 0.5 to 10 moles, preferably 1.5 to 5 moles.

As the solvent used in reacting a titanium compound of the general formula $Ti(OR^1)_nX_{3-n}$ with an ether compound and titanium tetrachloride in a slurry state in the presence of a magnesium halide, there may be cited aliphatic hydrocarbons such as pentane, hexane, heptane, octane, decane and the like, aromatic hydrocarbons such as toluene, xylene, decalin and the like, alicyclic hydrocarbons such as cyclohexane, methylcyclohexane and the like, and halogenated hydrocarbons such as 1,2-dichloroethane, butyl chloride, hexyl chloride, butyl bromide, monochlorobenzene, dichlorobenzene and the like, among which aromatic hydrocarbons are preferred.

The slurry concentration should be 0.01 to 0.5 g of solid/ml of solvent, preferably 0.05 to 0.35 g of solid/ml of solvent, and the reaction temperature should be 0° to 120° C., preferably 30° to 100° C. The reaction time is not specifically defined, but usually a reaction time of from 30 minutes to 6 hours is preferred.

As for the order of addition of a titanium compound of the general formula $Ti(OR^1)_nX_{3-n}$, a magnesium halide, an ether compound and titanium tetrachloride, they may be added in any order, but the following orders are especially preferred: (1) titanium compound, (2) ether compound, (3) titanium tetrachloride, and (4) magnesium halide, or (1) titanium compound, (2) magnesium halide, (3) ether compound and (4) titanium tetrachloride.

The solid catalyst component obtained in this invention contains hydrocarbyloxy groups in an amount of 0.001 to 0.3 mole, preferably 0.002 to 0.15 mole, to one mole of titanium atom. If the amount of said hydrocarbyloxy groups is greater than this range, the catalytic activity is lowered and also the α-olefin copolymerizability is worsened. The catalytic activity is also lowered if the amount of hydrocarbyloxy groups is below said range.

The titanium atom to magnesium atom ratio in the solid catalyst component is 0.01–2.0:1, preferably 0.03–1.0:1 by mole. If the ratio of titanium atoms is higher than this range, the catalytic activity per amount of titanium is lowered, while if the ratio of titanium atoms is less than said range, the catalytic activity per amount of solid catalyst is reduced.

The solid catalyst component obtained from said reaction is subjected to solid-liquid separation and then washed several times with an inert hydrocarbon solvent such as hexane, heptane, etc., before it is put to use for the olefin polymerization.

As the organoaluminum compound used for the olefin polymerization in this invention, the following may be mentioned: trialkylaluminum, dialkylaluminum hydride, dialkylaluminum halide, dialkylaluminum alkoxide, dialkylaluminum siloxide and mixtures thereof. More specifically, dimethylaluminum chloride, diethylaluminum chloride, diisobutylaluminum chloride, diethylaluminum bromide, diethylaluminum iodide, trimethylaluminum, triethylaluminum, triisobutylaluminum, diethylaluminum hydride, diethylaluminum ethoxide and mixtures thereof can be favorably used.

The amount of the organoaluminum compound used for the olefin polymerization can be selected within a wide range of from 0.1 to 500 moles per mole of titanium atoms in the hydrocarbyloxy group-containing solid catalyst component, but a range of from 0.5 to 200 moles is preferred.

The polymerization temperature usable in this invention ranges from 0° to 300° C.

The polymerization pressure is not critical, but it is preferred to apply a pressure from 8 to 2,000 atm. for the reason of industrial and economical advantages.

The polymerization can be conducted either batchwise or continuously.

The α-olefins usable with the present invention are those having 2 to 10 carbon atoms, such as ethylene, propylene, butene-B 1, pentene-1,4-methylpentene-1, hexene-1 and the like, but the scope of application of this invention is not limited to these compounds.

The form of polymerization in accordance with this invention may be either homopolymerization or copolymerization.

In the case of copolymerization, it is possible to obtain a desired copolymer by contacting two or more different types of α-olefins in a mixed state.

It is also easy with this invention to perform heteroblock copolymerization in which the polymerization is conducted in two or more stages.

The polymerization methods usable in this invention include slurry polymerization using an inert hydrocarbon solvent such as butane, pentane, hexane, heptane, octane or the like, solution polymerization in which the produced polymer stays dissolved in said inert hydrocarbon solvent, bulk polymerization in a liquefied monomer without solvent, and gas phase polymerization in a gaseous monomer.

It is further possible to add a chain transfer agent such as hydrogen for controlling the molecular weight of the polymer produced.

Hereinafter, the present invention will be described in accordance with the examples thereof, but it is to be understood that the invention is in no way limited by these examples. In the Examples given below, the content of butene-1 in the ethylene-butene-1 copolymer was determined from quantification of methyl groups at 1378 cm$^{-1}$ on an infrared absorption spectrum according to the method shown on page 142 of "Characterization and Properties of High Polymers" (Chemistry, Extra Number 43, pub. by Kagaku Dojin).

EXAMPLE 1

(A) Synthesis of titanium compound 110 ml of n-pentane and 67 ml of tetra-n-butoxytitanium were charged into a 500 ml flask equipped with a stirrer and a dropping funnel after replacing the inside atmosphere of the flask with argon gas, and the temperature in the flask was maintained at 35° C. Then a solution consisting of 108 ml of n-heptane and 44.8 ml of ethylaluminum sesquichloride was added dropwise slowly for a period of 2 hours from the dropping funnel while maintaining the inside temperature of the flask at 35° C. After completion of the dropwise addition, the temperature in the flask was raised to 60° C. and the mixture in the flask was stirred for one hour. The reaction mixture was allowed to stand at room temperature and was then subjected to solid-liquid separation, and the solids were washed four times successively with 100 ml of n-heptane and dried under reduced pressure to obtain a reddish drown titanium compound. This titanium compound contained 5.2 mmol of titanium and 7.0 mmol of n-butoxy group per gram of the compound.

(B) Synthesis of magnesium halide 15.9 g (0.66 mol) of magnesium chip for Grignard reaction was put into a 500 ml flask equipped with a stirrer, a reflux condenser and a dropping funnel, and the flask was heated at 120° C. for 2 hours while flowing argon gas into the system to completely drive out moisture on the inner wall of the flask and on the surfaces of the magnesium chip. 69 ml (0.66 mol) of n-butyl chloride and 280 ml of n-butyl ether were charged into the dropping funnel and about 80 ml of the mixed solution was added dropwise to the magnesium in the flask to start the reaction. After start of the reaction, the temperature in the system was maintained at 60° C. and dropwise addition of said mixed solution was continued to allow steady advancement of the reaction. After completion of said dropwise addition, the reaction was further continued at 60° C. for one hour and then the reaction solution was cooled to room temperature. The concentration of n-butylmagnesium chloride in the n-butyl ether was 2.0 mol/l.

80 mmol of said n-butylmagnesium chloride (40 ml ether solution) was fed into a 200 ml flask equipped with a stirrer and a dropping funnel after replacing the inside atmosphere of the flask with argon, and then 8.9 ml of silicon tetrachloride was added thereto dropwise slowly from the dropping funnel so as to maintain the inside temperature of the flask at 10° C. to form a white precipitate. After said dropwise addition, the reaction was further continued at 60° C. for one hour. The resulting reaction mixture was separated, washed and dried under reduced pressure to obtain 10.6 g of a white magnesium halide. The result of an analysis showed that this magnesium halide contained 28% by weight of n-butyl ether.

(C) Synthesis of solid catalyst component

Into a 100 ml flask, the inside atmosphere of which had been substituted with argon in advance, were charged 50 ml of toluene and 3.2 g of the titanium compound synthesized in (A) described above, and the temperature in the flask was maintained at 40° C.

Next, 2.5 ml of di-n-butyl ether and 3.3 ml of titanium tetrachloride were added into the flask, followed by additional feed of 8.9 g of the magnesium halide synthesized in (B) described above. The inside temperature of the flask was raised to 65° C. and said materials were reacted at 65° C. for one hour. After completion of the reaction, the reaction mixture was allowed to stand at room temperature and was subjected to solid-liquid separation, and the solid matter was washed four times successively with 50 ml of n-heptane and dried under reduced pressure to obtain a light-purple solid catalyst component.

In one gram of this solid catalyst component were contained 0.85 mmol of titanium, 6.22 mmol of magnesium and 0.035 mmol of n-butoxy group.

(D) Copolymerization of ethylene and butene-1

70 ml of an isoparaffinic hydrocarbon solvent (Goods name: IP Solvent 2028, available from Idemitsu Petrochemical Co., Ltd.) and 32.5 ml of triethylaluminum were charged at a temperature of 190° C. into a 130 ml stainless autoclave equipped with a magnetic stirrer after replacing the inside atmosphere of the autoclave with argon. Then a mixed gas of ethylene and butene-1 (butene-1 concentration: 25% by weight) was supplied into said autoclave and dissolved in the solvent, followed by additional feed of 10.6 mg of the solid catalyst component. The mixed gas was supplied so that the total pressure became 6 kg/cm$^2$ and the polymerization was carried out at 190° C. for one hour. After completion of polymerization, the unreacted monomer was purged and then 1 ml of n-decyl alcohol was added. The obtained polymer was fed into a large amount of methanol and subjected to a solid-liquid separation, followed by drying under reduced pressure at 70° C. for 6 hours to obtain 2.03 g of an ethylene-butene-1 copolymer. Thus, the yield (g) of the ethylene-butene-1 copolymer per gram of the solid catalyst component (hereinafter referred to as PE/cat) was 192 g (PE/cat=192). On the other hand, the yield (g) of the copolymer per gram of titanium atom in the solid catalyst component (hereinafter referred to as PE/Ti) was 4,700 g (PE/Ti=4,700). The butene-1 content in this copolymer was 7.6% by weight.

COMPARATIVE EXAMPLE 1

(A) Synthesis of titanium trichloride 80 ml of n-heptane and 20 ml of titanium tetrachloride were charged into a 300 ml flask after replacing the inside atmosphere of the flask with argon, and the mixed solution in the flask was maintained at −5° C. Then a solution consisting of 60 ml of n-heptane and 42 ml of ethylaluminum sesquichloride was added dropwise under a condition such that the reaction system temperature was maintained at −5° C. After completion of dropwise addition of this solution, the reaction temperature was raised to 65° C. and the reaction was further continued at this temperature for one hour. When the reaction was over, the reaction mixture was separated, washed with n-heptane and dried under reduced pressure to obtain 32 g of titanium trichloride.

(B) Synthesis of solid catalyst component

Into a 100 ml flask, the inside atmosphere of which had been substituted with argon in advance, were charged 50 ml of toluene and 2.6 g of titanium trichloride synthesized in (A) described above, and the inside temperature of the flask was maintained at 40° C. Then 2.9 ml of di-n-butyl ether and 3.7 ml of titanium tetrachloride were added into the flask, followed by further feeding of 5.4 g of the magnesium halide synthesized in (B) of Example 1. The temperature in the flask was raised to 65° C. and the materials in the flask were reacted at 65° C. for one hour. The reaction mixture was subjected to a solid-liquid separation and the solid matter was washed four times with 50 ml of n-heptane and then dried under reduced pressure to obtain a light-purple solid catalyst component. 1.44 mmol of titanium and 5.34 mmol of magnesium were contained in one gram of the solid catalyst component.

(C) Copolymerization of ethylene and butene-1

Copolymerization of ethylene and butene-1 was carried out in the same way as in (D) of Example 1 except for use of 18.9 mg of the solid catalyst component synthesized in (B) above.

The catalytic activity was as follows: PE/cat=29; PE/Ti=420. The butene-1 content in the obtained copolymer was 5.9% by weight.

COMPARATIVE EXAMPLE 2

(A) Synthesis of solid catalyst component 51.4 ml of n-heptane and 10.3 g of the halide of magnesium synthesized in (B) of Example 1 were charged into a 100 ml flask after replacing the inside atmosphere of the flask with argon. Then 22.2 ml of Ti(OBu)Cl$_3$ was added and the materials in the flask were reacted at 90° C. for 2 hours. The resulting reaction mixture was subjected to a solid-liquid separation and the solid matter was washed four times successively with 50 ml of n-heptane and then dried under reduced pressure to obtain a solid catalyst component. This solid catalyst component contained 1.81 mmol of titanium and 5.01 mmol of magnesium per gram of the component.

(B) Copolymerization of ethylene and butene-1

Copolymerization of ethylene and butene-1 was conducted in the same way as in (D) of Example 1 except for use of 16.4 mg of the solid catalyst component synthesized in (A) above.

The obtained copolymer had the following catalytic activity: PE/cat=109; PE/Ti=1250. Also, the copolymer contained 5.2% by weight of butene-1.

EXAMPLE 2

A solid catalyst component was synthesized in the same way as in (C) of Example 1 except for use of 2.6 g of the titanium compound, 2.1 ml of di-n-butyl ether, 2.7 ml of titanium tetrachloride and 4.0 g of the magnesium halide. This solid catalyst component contained, per gram thereof, 1.67 mmol of titanium, 5.56 mmol of magnesium and 0.18 mmol of n-butoxy group.

Copolymerization of ethylene and butene-1 was carried out by using 9.5 mg of said solid catalyst component in the same way as in (D) of Example 1. The produced copolymer showed the following catalytic activity: PE/cat=287; PE/Ti=3600. It also contained 8.2% by weight of butene-1.

EXAMPLE 3

(A) Synthesis of titanium compound 60 ml of n-heptane and 59 g of Ti(OC$_{10}$H$_{21}$)$_2$Cl$_2$ were charged into a 200 ml flask equipped with a stirrer and a dropping funnel after replacing the inside atmosphere of the flask with argon gas, and the inside of the flask was maintained at 60° C. Then a solution consisting of 40 ml of n-heptane and 17.5 ml of diethylaluminum chloride was added dropwise slowly into the flask from the dropping funnel for a period of 2 hours while maintaining the inside temperature of the flask at 60° C. After the dropwise addition, the mixture in the flask was further stirred for one hour. The reaction mixture was allowed to stand at room temperature and then subjected to a solid-liquid separation, and the solid matter was washed four times successively with 100 ml of n-heptane and then dried under reduced pressure to obtain a purple titanium compound. The titanium compound contained in one gram thereof 3.55 mmol of titanium and 3.42 mmol of —OC$_{10}$H$_{21}$ group.

(B) Synthesis of solid catalyst component 50 ml of toluene and 3.1 g of the titanium compound synthesized in (A) above were charged into a 100 ml flask after replacing the inside atmosphere of the flask with argon, and the inside of the flask was maintained at 40° C. Then 1.9 ml of di-n-butyl ether and 2.5 ml of titanium tetrachloride were added thereto, followed by additional feed of 4.7 g of the magnesium halide synthesized in (B) of Example 1. The inside temperature of the flask was raised to 75° C. and the materials in the flask were reacted at this temperature for one hour. The resulting reaction mixture was subjected to a solid-liquid separation and the solid matter was washed four times successively with 50 ml of n-heptane and then dried under reduced pressure to obtain a light-purple solid catalyst component. The solid catalyst component contained, per gram thereof, 1.75 mmol of titanium, 6.12 mmol of magnesium and 0.074 mmol of —OC$_{10}$H$_{21}$ group.

(C) Copolymerization of ethylene and butene-1

Copolymerization of ethylene and butene-1 was carried out in the same way as in (D) of Example 1 except for use of 12.6 mg of the solid catalyst component synthesized in (B) above. The obtained copolymer showed the following catalytic activity: PE/cat=263; PE/Ti=3130. The butene-1 content in this copolymer was 7.9% by weight.

EXAMPLE 4

High-pressure polymerization of ethylene

High-pressure polymerization of ethylene was conducted in a stirring type 140 ml autoclave by using 0.1 mg of the solid catalyst component synthesized in (C) of Example 1 and 0.045 mmol of triethylaluminum under the polymerization condition that partial pressure of hydrogen was 20 kg/cm$^2$, ethylene pressure was 1,000 kg/cm$^2$, polymerization temperature was 200° C. and polymerization time was 60 seconds. The ethylene and hydrogen used for the polymerization had been sufficiently deaerated and purified before use.

As the result of polymerization, the catalytic activity per gram of the solid catalyst component was PE/cat=16,000, and the catalytic activity per gram of titanium atom was PE/Ti=392,000.

COMPARATIVE EXAMPLE 3

(A) Synthesis of solid catalyst component 10 g of the magnesium halide synthesized in (B) of Example 1 and 50 ml of titanium tetrachloride were charged into a 100 ml flask after replacing the inside atmosphere of the flask with argon, and they were reacted at 100° C. for one hour. The resulting reaction product was washed repeatedly with n-heptane, until no titanium tetrachloride could be detected in the washings, and then dried under reduced pressure to obtain a solid catalyst component. The solid catalyst component contained 0.58 mmol of titanium and 8.95 mmol of magnesium per gram of the component. By using 0.2 mg of the solid catalyst component, high pressure polymerization of ethylene was performed in the same way as in Example 4.

The polymerization gave the following results: PE/cat=8,900 and PE/Ti=318,000.

What is claimed is:

1. A catalyst system for the polymerization of olefins comprising:
   (A) a solid catalyst component containing hydrocarbyloxy groups said component being obtained by reacting a titanium compound represented by the general formula Ti(OR$^1$)$_n$X$_{3-n}$ (wherein R$^1$ is a hydrocarbon group having 1 to 20 carbon atoms, X is a halogen atom, and n is a number defined by 0<n≦3) with an ether compound and titanium tetrachloride in a slurry state in the presence of a magnesium halide, and (B) an organoaluminum compound.

2. A catalyst system according to claim 1, wherein the magnesium halide is one produced by reacting an organomagnesium compound and an aluminum halide compound represented by the general formula R$^2_m$AlX$_{3-m}$ (wherein R$^2$ is an alkyl, aryl or alkenyl group having 1 to 8 carbon atoms, X is a halogen atom, and m is a number defined by 0≦m<3) and/or a silicon halide compound represented by the general formula R$^3_l$SiX$_{4-l}$ (wherein R$^3$ is an alkyl, aryl or alkenyl group having 1 to 8 carbon atoms, X is a halogen atom, and l is a number defined by 0≦l<4).

3. A catalyst system according to claim 1, wherein X in the general formula Ti(OR$^1$)$_n$X$_{3-n}$ is chlorine.

4. A catalyst system according to claim 1, wherein the hydrocarbon group R$^1$ in the titanium compound represented by the general formula Ti(OR$^1$)$_n$X$_{3-n}$ is an alkyl group having 2 to 18 carbon atoms or an aryl group having 6 to 18 carbon atoms.

5. A catalyst system according to claim 1, wherein the ether compound is dialkyl ether.

6. A catalyst system according to claim 1, wherein the amount of the ether compound added is 0.1 to 5 moles per mole of the compound of the general formula Ti(OR$^1$)$_n$X$_{3-n}$.

7. A catalyst system according to claim 1, wherein the amount of titanium tetrachloride added is 0.1 to 10 moles per mole of the compound of the general formula Ti(OR$^1$)$_n$X$_{3-n}$.

8. A catalyst system according to claim 1, wherein the amount of the hydrocarbyloxy groups contained in the solid catalyst component is 0.001 to 0.3 mole per mole of titanium contained in said solid catalyst component.

9. A catalyst system according to claim 1, wherein the amount of titanium contained in the solid catalyst component is 0.01 to 2.0 moles per mole of magnesium contained in said solid catalyst component.

10. A process for producing olefin polymers by using a catalyst system comprising:

(A) a solid catalyst component containing hydrocarbyloxy groups said component being obtained by reacting a titanium compound represented by the general formula Ti(OR$^1$)$_n$X$_{3-n}$ (wherein R$^1$ is a hydrocarbon group having 1 to 20 carbon atoms, X is a halogen atom, and n is a number defined by 0<n≦3) with an ether compound and titanium tetrachloride in a slurry state in the presence of magnesium halide, and (B) an organoaluminum compound.

11. A process according to claim 10, wherein the magnesium halide is one produced by reacting an organomagnesium compound with an aluminum halide compound represented by the general formula R$^2_m$AlX$_{3-m}$ (wherein R$^2$ is an alkyl, aryl or alkenyl group having 1 to 8 carbon atoms, X is a halogen atom, and m is a number defined by 0≦m<3) and/or a silicon halide compound represented by the general formula R$^3_l$SiX$_{4-l}$ (wherein R$^3$ is an alkyl, aryl or alkenyl group having 1 to 8 carbon atoms, X is a halogen atom, and l is a number defined by 0≦l<4).

12. A process according to claim 10, wherein X in the general formula Ti(OR$^1$)$_n$X$_{3-n}$ is chlorine.

13. A process according to claim 10, wherein the hydrocarbon group R$^1$ in the titanium compound represented by the general formula Ti(OR$^1$)$_n$X$_{3-n}$ is an alkyl group having 2 to 18 carbon atoms or an aryl group having 6 to 18 carbon atoms.

14. A process according to claim 10, wherein the ether compound is dialkyl ether.

15. A process according to claim 10, wherein the amount of the ether compound added is 0.1 to 5 moles per mole of the compound of the general formula Ti(OR$^1$)$_n$X$_{3-n}$.

16. A process according to claim 10, wherein the amount of titanium tetrachloride added is 0.1 to 10 moles per mole of the compound of the general formula Ti(OR$^1$)$_n$X$_{3-n}$.

17. A process according to claim 10, wherein the amount of hydrocarbyloxy groups contained in the solid catalyst component is 0.001 to 0.3 mole per mole of titanium contained in said solid catalyst component.

18. A process according to claim 10, wherein the amount of titanium contained in the solid catalyst component is 0.01 to 2.0 moles per mole of magnesium contained in said solid catalyst component.

* * * * *